(12) United States Patent
Haar et al.

(10) Patent No.: US 11,017,745 B2
(45) Date of Patent: May 25, 2021

(54) METHOD, COMPUTER READABLE STORAGE MEDIUM HAVING INSTRUCTIONS, APPARATUS AND SYSTEM FOR CALIBRATING AUGMENTED REALITY GOGGLES IN A TRANSPORTATION VEHICLE, TRANSPORTATION VEHICLE SUITABLE FOR THE METHOD, AND AUGMENTED REALITY GOGGLES SUITABLE FOR THE METHOD

(71) Applicant: VOLKSWAGEN AKTIENGESELLSCHAFT, Wolfsburg (DE)

(72) Inventors: Adrian Haar, Hannover (DE); Johannes Tümler, Wellen (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/214,661

(22) Filed: Dec. 10, 2018

(65) Prior Publication Data

US 2019/0180717 A1    Jun. 13, 2019

(30) Foreign Application Priority Data

Dec. 12, 2017    (DE) ............... 10 2017 222 534.3

(51) Int. Cl.
   G09G 5/37      (2006.01)
   G06K 9/62      (2006.01)
   G02B 27/01     (2006.01)

(52) U.S. Cl.
   CPC ............ *G09G 5/37* (2013.01); *G02B 27/017* (2013.01); *G02B 27/0172* (2013.01);
   (Continued)

(58) Field of Classification Search
   CPC .......... G06T 19/006; G06T 7/70; G06T 7/73; G06T 7/74; G06T 7/80; G06T 7/85;
   (Continued)

(56) References Cited

U.S. PATENT DOCUMENTS 10,210,670 B2    2/2019  Yamazaki
10,229,511 B2    3/2019  Meier
(Continued)

FOREIGN PATENT DOCUMENTS

CN    106650723 A    5/2017
CN    106710360 A    5/2017
(Continued)

OTHER PUBLICATIONS

Jens Grubert, Yuta Itoh, Kenneth Moser, and J. Edward Swan II; A Survey of Calibration Methods for Optical See-Through Head-Mounted Displays; Sep. 13, 2017; arXiv preprint arXiv: 1709.04299; pp. 1-15. (Year: 2017).*
(Continued)

*Primary Examiner* — Jeffery A Brier
(74) *Attorney, Agent, or Firm* — Barnes & Thornburg LLP

(57) ABSTRACT

A method, a computer-readable storage medium with instructions, a device, and a system for calibrating a pair of augmented-reality glasses in a transportation vehicle and a transportation vehicle and a pair of augmented-reality glasses suitable for the method. A set of points in an interior of the transportation vehicle is illuminated sequentially. At least a subset of the illuminated points are captured by a camera arranged in the pair of augmented-reality glasses. Through a comparison of the subset of the illuminated points that have been captured by the camera with a known geometry of the set of points, a transformation specification for the pair of augmented-reality glasses is determined.

13 Claims, 4 Drawing Sheets

(52) U.S. Cl.
CPC ...... *G06K 9/6202* (2013.01); *G02B 2027/014* (2013.01); *G02B 2027/0138* (2013.01); *G02B 2027/0178* (2013.01); *G09G 2380/10* (2013.01)

(58) Field of Classification Search
CPC .. G09G 2380/10; G09G 2380/12; G09G 5/37; G02B 27/017; G02B 27/0172; G02B 2027/014; G02B 2027/0138; G02B 2027/0178; G06F 3/011; G06F 3/012; G06K 9/6202
See application file for complete search history.

(56) References Cited

U.S. PATENT DOCUMENTS

| | | | |
|---|---|---|---|
| 2012/0120070 | A1 | 5/2012 | Baillot |
| 2013/0120224 | A1* | 5/2013 | Cajigas ............ G09G 5/00 345/8 |
| 2016/0005174 | A1 | 1/2016 | Ellsworth et al. |
| 2016/0260251 | A1* | 9/2016 | Stafford ............ G02B 27/0179 |
| 2018/0007343 | A1 | 1/2018 | Send et al. |
| 2018/0031829 | A1* | 2/2018 | Thomas ............ G02B 27/017 |

FOREIGN PATENT DOCUMENTS

| | | |
|---|---|---|
| CN | 106796771 A | 5/2017 |
| CN | 107003120 A | 8/2017 |
| DE | 102013209721 A1 | 2/2014 |
| DE | 102014217962 A1 | 3/2016 |
| DE | 102014217963 A1 | 3/2016 |
| DE | 102014218406 A1 | 3/2016 |
| DE | 102014221190 A1 | 3/2016 |
| WO | 9711386 A1 | 3/1997 |
| WO | 2010066698 A1 | 6/2010 |

OTHER PUBLICATIONS

Stuart J. Gilson, Andrew W. Fitzgibbon, and Andrew Glennerster; Spatial calibration of an optical see-through head mounted display; Aug. 15, 2008; Journal of neuroscience Methods; 173(1):140-146; pp. 1-19. (Year: 2008).*

Arthur Tang, Ji Zhou, and Charles Owen; Evaluation of Calibration Procedures for Optical See-Through Head-Mounted Displays; Oct. 10, 2003; Proceedings of the 2nd IEEE and ACM International Symposium on Mixed and Augmented Reality (ISMAR '03); IEEE Computer Society; pp. 1-8. (Year: 2003).*

Berg; The Vehicle in the Loop—A Tool for the Development and Evaluation of Safety-Critical Driver Assistance Systems; Dissertation; Department of Aerospace Engineering at the Bundeswehr University, Munich; 2014 downloaded from http://athene-forschung.unibw.de/node?id=97267.

Davison; Real-Time Simultaneous Localisation and Mapping with a Single Camera; Proceedings of the Ninth IEEE International Conference on Computer Vision; 2003.

Search Report for German Patent Application No. 10 2017 222 534.3; dated Sep. 21, 2018.

* cited by examiner

METHOD, COMPUTER READABLE STORAGE MEDIUM HAVING INSTRUCTIONS, APPARATUS AND SYSTEM FOR CALIBRATING AUGMENTED REALITY GOGGLES IN A TRANSPORTATION VEHICLE, TRANSPORTATION VEHICLE SUITABLE FOR THE METHOD, AND AUGMENTED REALITY GOGGLES SUITABLE FOR THE METHOD

PRIORITY CLAIM

This patent application claims priority to German Patent Application No. 10 2017 222 534.3, filed 12 Dec. 2017, the disclosure of which is incorporated herein by reference in its entirety.

SUMMARY

Illustrative embodiments relate to a method, a computer-readable storage medium with instructions, a device, and a system for calibrating a pair of augmented-reality glasses in a transportation vehicle. Illustrative embodiments also relate to a transportation vehicle and augmented-reality glasses which are suitable for the implementation of the disclosed method.

BRIEF DESCRIPTION OF THE DRAWINGS

Further embodiments will become apparent from the following description and the appended claims in conjunction with the figures.

DETAILED DESCRIPTION

Figure 1:
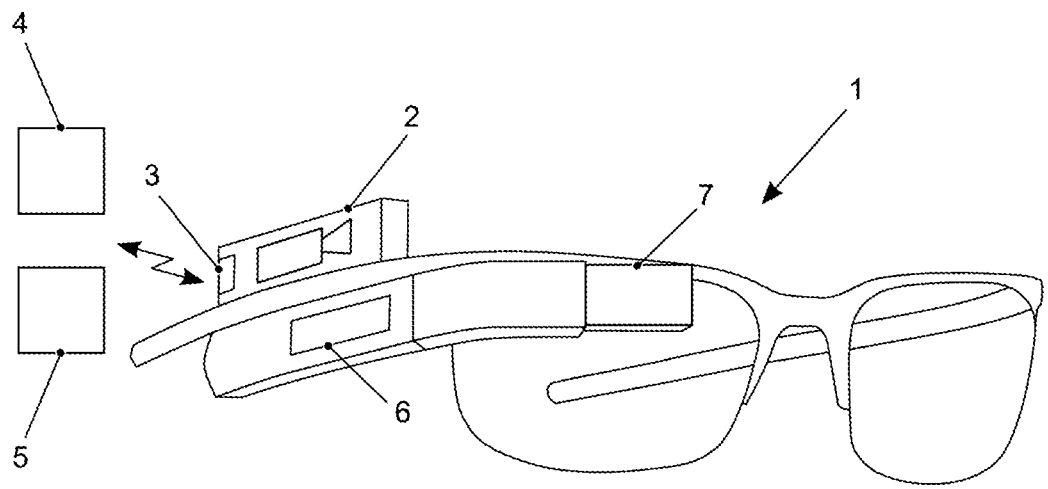
FIG. 1 schematically shows a pair of augmented-reality glasses.

With the continuous development of virtual- and augmented-reality technologies and applications, these are also finding their way into transportation vehicles. Augmented-reality (AR), ("erweiterte Realität", in German) relates to the enrichment of the real world through virtual elements which are registered at the correct location in three-dimensional space and which permit a real-time interaction. Because the expression "augmented reality" has gained precedence in the German-speaking technical world over the expression "erweiterte Realität", the former will be used below. The expression "mixed reality" is also used synonymously.

Augmented-reality glasses offer one possible technical realization for enhancing the driver's workplace accordingly with virtual extensions having the correct perspective. Augmented-reality glasses are worn like normal glasses, but comprise one or a plurality of projection units or displays with the aid of which information can be projected to the wearer of the glasses, in front of the eyes or directly onto the retina. The glasses are designed here in such a way that the wearer can also perceive the surroundings. Optionally, information or instructions are displayed to the wearer in a contact-analog manner. The display of the information or instructions takes place here at a location that is oriented to the location of an object in the surroundings, e.g., adjacent to the object or overlaying it. Fewer head and eye movements are necessary for reading the information due to the optical overlay of the display and the driving scene. The adaptation effort is also reduced for the eyes, since, depending on the virtual distance of the display, less or even no accommodation at all is required. Through marking objects and overlaying information at its real reference location, i.e., through the contact-analog representation, information relating to the environment can be represented directly in the field of view of the driver. Since the displays can be represented as "part of the environment", it is possible for the wearer to make exceptionally fast and intuitive interpretations. This direct, graphical enhancement of the environment, such as augmented reality, can therefore significantly reduce the cognitive transfer requirements.

The registration of the virtual information in the real field of view of the driver in accordance with augmented reality places very high requirements on the technical implementation. To be able to represent virtual contents at an accurate location and with the correct perspective in reality, very detailed knowledge about the surroundings and the movement of the transportation vehicle itself is necessary. The attitude of the pair of augmented-reality glasses, i.e., their position and alignment relative to the transportation vehicle, must also be known.

Inertial measuring systems based on mass inertia can be used to determine the attitude of augmented-reality glasses. The sensors of such measuring systems are fastened directly to the glasses, and measure the movements of the glasses by capturing accelerations. One drawback of the inertial systems is that only relative measurements take place, and a drift, which within a short time makes the tracking result unusable, arises as a result of the double integration. For that reason, inertial systems necessarily have to be coupled to a non-drifting measuring system.

Optical measuring systems are therefore used as a rule for the determination of the attitude of augmented-reality glasses. An observation of the object to be tracked usually takes place here from outside, for which reason such systems are spoken of as outside-in tracking. An additional sensor system, e.g., a camera that captures the movements of the pair of augmented-reality glasses, is, for example, available for this purpose in the transportation vehicle.

Guy Berg: "Das Vehicle in the Loop—Ein Werkzeug fur die Entwicklung and Evaluation von sicherheitskritischen Fahrerassistenzsystemen" (The Vehicle in the Loop—A Tool for the Development and Evaluation of Safety-Critical Driver Assistance Systems), dissertation at the Department of Aerospace Engineering at the Bundeswehr University, Munich (2014), for example, describes a test and simulation environment for driver assistance systems. A test and simulation environment, complete with integrated traffic simulation, is linked here to a real test transportation vehicle. With the aid of a Head-Mounted Display (HMD), the driver is here placed into an augmented or virtual reality, so that he receives a direct visual feedback from the simulated environment, along with tactile, vestibular, somatoensory and acoustic feedback from the interaction with the real transportation vehicle. The position and orientation of the transportation vehicle on a test track are located when in operation. Through knowledge of these in the real world, the corresponding position and orientation of the transportation vehicle in the virtual world are also known. The viewing direction of the driver is additionally determined with the aid of a sensor mounted in the transportation vehicle. The image of the virtual world corresponding to reality is generated in the simulation software with the aid of the position and orientation of the transportation vehicle as well as of the driver's viewing direction, and is visually displayed to the driver via the HMD. An optical tracking of the head which uses optical markers is employed here.

One drawback of the outside-in system is that a second measuring system is needed in addition to the glasses.

The so-called inside-out tracking, in which the measuring system is integrated into the object to be tracked, i.e., the environment is captured from the point of view of the object, can be used as an alternative to outside-in tracking. The measuring system itself is moved here.

DE 10 2014 217 962, for example, describes a method for the determination of an attitude of a pair of data glasses in a transportation vehicle interior, in which a predefined infrared pattern is recognized in the recordings of a camera of the data glasses. Such a pattern is here displayed in the environment of the data glasses with the aid of a display that is already present in the transportation vehicle. The position and orientation of this pattern is known to the data glasses. The data glasses deduce the position and alignment of the data glasses, i.e., their attitude, from the geometric form of the pattern recognized in the recordings of the camera.

DE 10 2014 221 190 describes a method for the determination of a position or alignment of a pair of data glasses in a transportation vehicle. The transportation vehicle interior is recorded by a camera of the data glasses. The recordings of the camera are evaluated, and markers are detected in the recordings. The markers are not visible to the human eye. The position or alignment of the data glasses are determined depending on the position of the markers recognized in the recordings.

Modern augmented-reality glasses often use visual systems and machine learning to determine the orientation of the glasses in space as accurately as possible, and from that to generate correctly oriented overlays for the user. The attitude and movement of the glasses are determined here through methods of optical measuring technology depending on prominent corners and edges in the surrounding space.

An important challenge for the correctly oriented overlay of objects in augmented-reality glasses is the correct determination of the orientation of the glasses relative to the observed object. The operation of spatially registering the glasses system with respect to known objects is called calibration. Known methods of calibration use a multi-point method in which known 3-D coordinates of the observed object are correlated with points observed in real space. A point of the corner of an observed object is, for example, marked in real space, and correlated with the same point in virtual space. This is repeated with a plurality of points, from which a transformation specification of the coordinate system of the glasses into the object coordinate system can be determined.

The assignment between the points in real space and in virtual space must at present still be carried out manually, in that the real points in the camera image are selected or brought into alignment one after another. This is often not reasonable for a user in a transportation vehicle, for example, when driving.

Disclosed embodiments indicate alternative solutions for calibrating a pair of augmented-reality glasses.

Disclosed embodiments provide a method, a computer-readable storage medium with instructions, a device, a system, a transportation vehicle, and augmented-reality glasses.

According to a first disclosed embodiment, a method for calibrating a pair of augmented-reality glasses in a transportation vehicle comprises:
  sequential illumination of a set of points in an interior of the transportation vehicle;
  capture at least a subset of the illuminated points by a camera arranged in the pair of augmented-reality glasses; and
  determination of a transformation specification for the pair of augmented-reality glasses through a comparison of the subset of the illuminated points that have been captured by the camera with a known geometry of the set of points.

According to a further disclosed embodiment, a computer-readable storage medium contains instructions which, when executed by a computer, cause the computer to execute the following operations for calibrating a pair of augmented-reality glasses in a transportation vehicle:
  sequential illumination of a set of points in an interior of the transportation vehicle;
  capture of at least a subset of the illuminated points by a camera arranged in the pair of augmented-reality glasses; and
  determination of a transformation specification for the pair of augmented-reality glasses through a comparison of the subset of the illuminated points that were captured by the camera with a known geometry of the set of points.

According to a further disclosed embodiment, a device for calibrating a pair of augmented-reality glasses in a transportation vehicle comprises:
  a control module for controlling at least one light source arranged in the transportation vehicle for the sequential illumination of a set of points in an interior of the transportation vehicle;
  an analysis unit for the determination of information regarding at least a subset of the illuminated points that have been captured by a camera of the pair of augmented-reality glasses; and
  a calibration module for the determination of a transformation specification for the pair of augmented-reality glasses through a comparison of the subset of the illuminated points with a known geometry of the set of points.

According to a further disclosed embodiment, a system for calibrating a pair of augmented-reality glasses in a transportation vehicle comprises:
  at least one light source arranged in the transportation vehicle for the sequential illumination of a set of points in an interior of the transportation vehicle;
  a camera arranged in the pair of augmented-reality glasses for the capture of at least a subset of the illuminated points; and
  a calibration module for the determination of a transformation specification for the pair of augmented-reality glasses through a comparison of the subset of the illuminated points that have been captured by the camera with a known geometry of the set of points.

According to a further disclosed embodiment, a transportation vehicle comprises at least one light source arranged in an interior, wherein the at least one light source is designed to illuminate sequentially a set of points in an interior of the transportation vehicle for calibrating a pair of augmented-reality glasses.

According to a further disclosed embodiment, a pair of augmented-reality glasses comprises a camera for capturing the surroundings of the pair of augmented-reality glasses and a calibration module for the determination of a transformation specification for the pair of augmented-reality glasses, wherein the calibration module is designed to determine the transformation specification through a comparison of a subset of illuminated points captured by the camera out of a set of sequentially illuminated points with a known geometry of the set of points.

The present disclosure is based on the approach of first specifying points in the interior of the transportation vehicle that are to be used for the calibration. Prominent points can be selected for this purpose in a CAD model of the later application environment of the pair of augmented-reality glasses. These selected points should cover the largest possible area in which the user will later move, distributed, for example, over the full width of the cockpit of an entire transportation vehicle. At least one light source is then installed in the real transportation vehicle, by which real points are illuminated at exactly the coordinates that were previously selected in the CAD model. This illumination of these points is performed sequentially, so that only one point is illuminated at all stages during a calibration phase. The illuminated points in the camera image are identified and stored one after another with the aid of the camera of the pair of augmented-reality glasses. To ensure a reliable capture of the points, the duration of the illumination for each point may be at least two frames of the camera used in the pair of augmented-reality glasses. When all the points, or at least an adequate number of points, have been captured, the stored points are passed in accordance with their sequence to a calibration is algorithm, and the calibration is thus carried out. Due to the sequential illumination of the points, each illuminated point can be assigned unambiguously to a point selected in the CAD model without any action from the user. The full duration of the calibration lies in the range of a few seconds.

The term "augmented-reality glasses" is to be understood here broadly, and, without restricting the generality, also comprises mixed-reality glasses, data glasses and head-mounted displays.

According to at least one disclosed embodiment, the individual points are illuminated in a specified sequence during the sequential illumination of the set of points in the interior of the transportation vehicle. An unambiguous assignment of the illuminated points to the points selected in the CAD model is simplified in this way. It is sufficient for the specified sequence to be known to the calibration module. At the beginning of the sequence of illumination, the point in the CAD model to which the currently illuminated point belongs is then always trackable.

According to at least one disclosed embodiment, an initialization of the calibration phase is performed by a single or repeated simultaneous illumination of the set of points. The illumination sequence may be repeated a plurality of times. When all the points have been illuminated in sequence, all of the points are illuminated together briefly for the same duration. They can also here flash simultaneously in a defined sequence. This common illumination or flashing is used as the initialization signal. As a result of this, the pair of augmented-reality glasses can determine later when the first point is illuminated, i.e., when the sequence begins.

According to at least one disclosed embodiment, the capture of an illuminated point by the camera involves a search in the camera image in the surroundings of a position at which an illuminated point was located in the camera image during the initialization. Points of light in the camera image are searched for continuously during an initialization phase. Particularly bright points are detected here. Points that are illuminated together for a certain duration, or that are flashing in a defined sequence, can be searched for at the same time. The positions of the detected points in the camera image are stored. When the illumination or flashing stops, the pair of augmented-reality glasses knows that the first point of the sequence will now be illuminated. A search is made for this illuminated point in the camera image in the surroundings of the previously stored positions. In this way it is not necessary for the entire camera image to be analyzed, whereby the required computing effort is reduced.

According to at least one disclosed embodiment, in the case of an unsuccessful search for an illuminated point, a search for a subsequent illuminated point is initiated after a defined period of time. If an expected illuminated point is not detected within a predetermined time, e.g., within the illumination duration of the light source, it did not lie in the field of view of the camera. A transfer is then made to the next point. This ensures that during a search for a particular illuminated point, the next point in the sequence is not incorrectly detected and incorrectly assigned.

According to at least one disclosed embodiment, information regarding a currently illuminated point is transmitted by the transportation vehicle to the pair of augmented-reality glasses. This approach manages without a special signaling of a start of the sequential illumination of the points. A wireless or wired connection of the pair of augmented-reality glasses to a transportation vehicle computer is used instead. The transportation vehicle computer signals to the pair of augmented-reality glasses by, for example, data telegrams, which of the points is currently illuminated, or also whether all the points are illuminated. The pair of augmented-reality glasses accordingly attempts to find this specifically illuminated point in the image. The transportation vehicle computer controls the illumination of the individual points in sequence, and informs the pair of augmented-reality glasses in each case which of the points is involved.

According to at least one disclosed embodiment, for the illumination of a point, the point is irradiated by a light source, or a light source located at the position of the point is activated. One or a plurality of laser diodes which transmit light to the specified coordinates can, for example, be installed in the transportation vehicle as a light source. This has the benefit that only one central light source, or only a few light sources, have to be installed and controlled, whereby the effort for cabling is reduced. Individual light sources that transmit light in the direction of the user can, alternatively, be installed at the specified coordinates. Although this approach does require a larger number of light sources, the adjustment effort required for the exact illumination of the desired coordinates is eliminated. Both approaches can, of course, also be combined. Optionally, the light sources transmit light, infrared light, for example, of a wavelength not visible to the human eye.

According to at least one disclosed embodiment, a request is made to a wearer of the pair of augmented-reality glasses to make a head movement. For the purposes of the calibration, the user can be required to make an initialization movement. The user can, for example, be requested to turn his head once from left to right. The region captured during the calibration phase by the camera is enlarged by such a movement, whereby more points can be captured, and the precision of the transformation specification can be increased.

The disclosed embodiments can be implemented in very different types of transportation vehicles, for example, in motor vehicles, railway vehicles, aircraft or water vehicles.

Disclosed embodiments are explained in more detail below with reference to the figures for a better understanding of the principles of the present disclosure. It will be clear that the disclosure is not restricted to these embodiments, and that the features described can also be combined or modified without leaving the protective scope of the disclosure as is defined in the appended claims.

FIG. 1 schematically shows a pair of augmented-reality glasses 1. The pair of augmented-reality glasses 1 has a camera 2 for capturing surroundings data of the surroundings of the pair of augmented-reality glasses 1. The camera 2 here may be designed to capture not only light that is visible to humans, but also light of a wavelength that is not visible to humans. A connection to an external attitude-determination device 4 for determining an attitude of the pair of augmented-reality glasses 1 on the basis of the surroundings data is provided by an interface 3. The attitude-determination device 4 can, for this purpose, detect and evaluate, for example, edges or prominent points in the image data. The attitude-determination device 4 can, of course, also be an element of the pair of augmented-reality glasses 1. The interface 3 further provides a connection to an external calibration module 5 for determining a transformation specification for the pair of augmented-reality glasses. For this purpose the calibration module 5 can compare sequentially illuminated points that were captured during a calibration phase by the camera 2 with a known geometry of the points. The calibration module 5 can, of course, also be an element of the pair of augmented-reality glasses 1. The display of the pair of augmented-reality glasses 1 can be adjusted by a graphics unit 6 according to the determined attitude, making use of the transformation specification. The attitude-determination device 4 and the graphics unit 6 can exchange data with one another for this purpose. As is illustrated in the example, the graphics unit 6 can be an element of the pair of augmented-reality glasses 1, or can be connected via an interface to the pair of augmented-reality glasses 1. The display generated by the graphics unit 6 is superimposed by a projection unit 7. A monocular display is used in the example in FIG. 1, i.e., a display is only arranged in front of one eye of the user. The solution presently described can, of course, also be realized with a pair of augmented-reality glasses 1 with a binocular display in which one display is used per eye, or with a binocular display in which a common display is used for both eyes.

Figure 2:
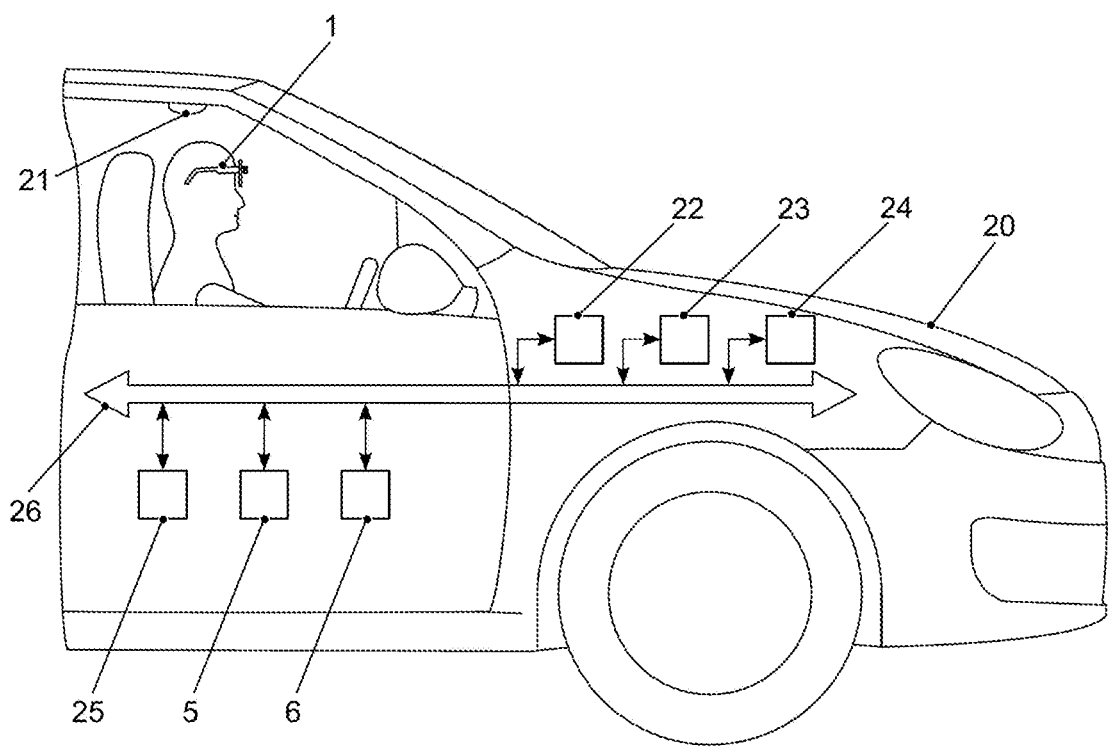
FIG. 2 schematically shows a system for calibrating a pair of augmented-reality glasses in a transportation vehicle.

FIG. 2 schematically shows a system for calibrating a pair of augmented-reality glasses 1 in a transportation vehicle 20. In the example in FIG. 2, the transportation vehicle 20 is a motor transportation vehicle. At least one light source 21 that sequentially illuminates prominent points of the interior, optionally with light of a wavelength that is not perceptible for humans, is installed in the interior of the transportation vehicle 20. A camera of the pair of augmented-reality glasses 1 captures at least a subset of the illuminated points, and transmits information regarding the captured subset of the illuminated points via a wireless or wired connection to a calibration module 5. In this example, the calibration module 5 is arranged in the transportation vehicle 20, and is not an element of the pair of augmented-reality glasses 1. Through a comparison of the illuminated points that have been captured by the camera with a known geometry of the points, the calibration module 5 can determine a transformation specification for the pair of augmented-reality glasses 1. The transportation vehicle 20 in the example shown further comprises a navigation system 22, a data transmission unit 23 as well as a range of assistance systems 24, of which one is illustrated by way of example. A connection to service providers can be established by the data transmission unit 23. A memory 25 is present for the storage of data. The data exchange between the different components of the transportation vehicle 20 takes place over a network 26. A display is calculated for the pair of augmented-reality glasses 1 by a graphics unit 6 from the data of the various transportation vehicle systems. In FIG. 2, the graphics unit 6 is realized in the transportation vehicle 20, but it can also, as is shown in FIG. 1, be an element of the pair of augmented-reality glasses 1.

Figure 3:
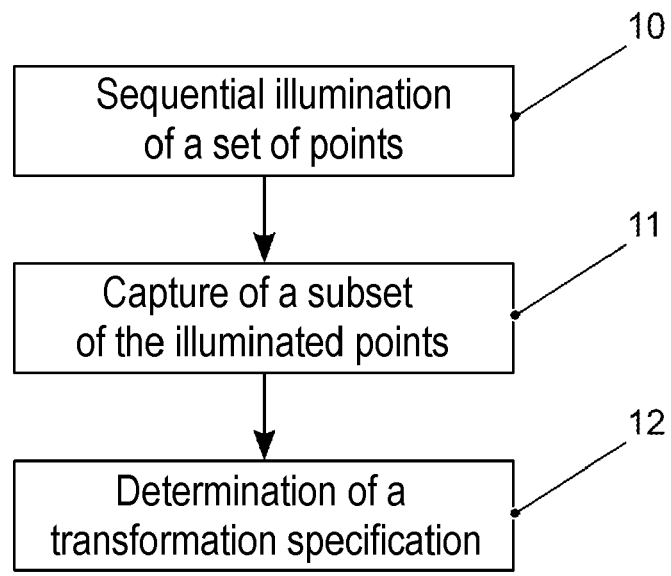
FIG. 3 schematically shows a method for calibrating a pair of augmented-reality glasses in a transportation vehicle.

FIG. 3 schematically shows a method for calibrating a pair of augmented-reality glasses in a transportation vehicle. In a first operation, a set of points in an interior of the transportation vehicle are illuminated 10 sequentially. The points can, for this purpose, be irradiated by a light source, or light sources located at the positions of the points can be activated. The individual points may be illuminated in a specified sequence. An initialization of the calibration phase can take place here by a single or repeated simultaneous illumination of the set of points. The transportation vehicle can alternatively transmit information regarding a currently illuminated point to the pair of augmented-reality glasses. At least a subset of the illuminated points is captured 11 by a camera arranged in the pair of augmented-reality glasses. Here, a search in the camera image can take place in the surroundings of a position at which an illuminated point was located in the camera image during an initialization. In the case of an unsuccessful search for an illuminated point in the camera image, a search for a subsequent illuminated point is then initiated after a defined period of time. Through a comparison of the subset of the illuminated points that have been captured by the camera with a known geometry of the set of points, a transformation specification for the pair of augmented-reality glasses can finally be determined 12.

Figure 4:
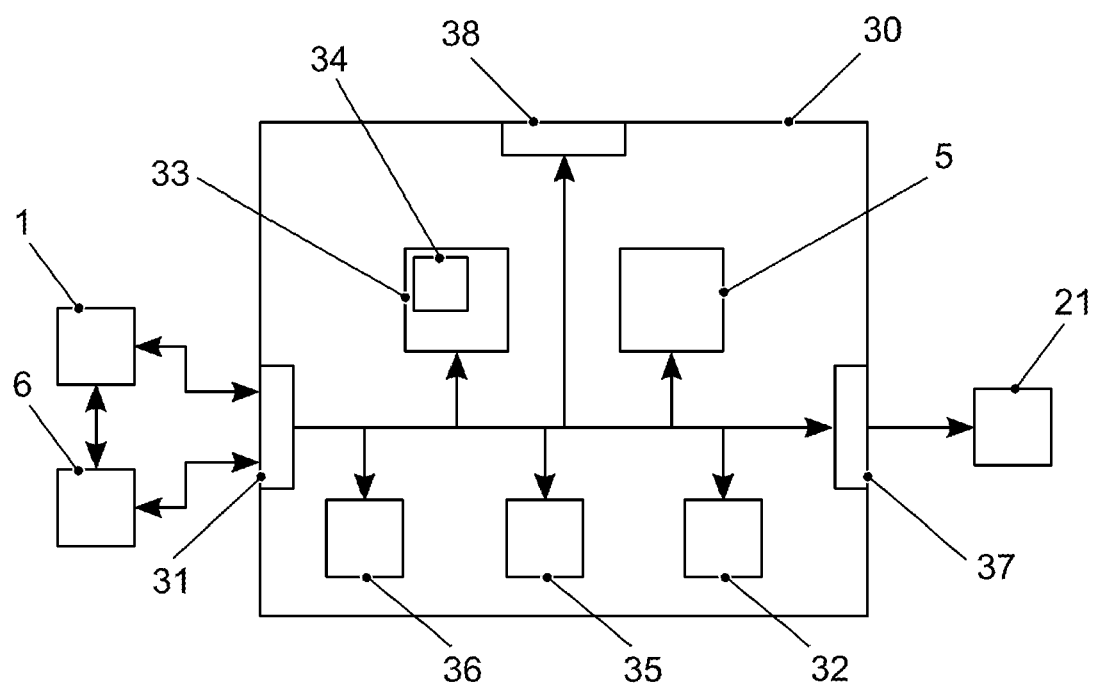
FIG. 4 shows a first embodiment of a device for calibrating a pair of augmented-reality glasses in a transportation vehicle.

FIG. 4 shows a simplified schematic illustration of a first disclosed embodiment of a device 30 for calibrating a pair of augmented-reality glasses 1 in a transportation vehicle. The device 30 has an interface 31, via which data of the pair of augmented-reality glasses 1, for example, images of a camera of the pair of augmented-reality glasses 1 or information determined from the images, can be received and via which data can be output to the pair of augmented-reality glasses 1. The device 30 also has a control module 32 for controlling at least one light source 21 arranged in the transportation vehicle via an output 37. The at least one light source 21 is controlled here in such a way that a set of points in an interior of the transportation vehicle is illuminated sequentially. The points can, for this purpose, be irradiated by the at least one light source 21, or light sources 21 located at the positions of the points can be activated. The individual points may be illuminated in a specified sequence. An initialization of the calibration phase can take place here by a single or repeated simultaneous illumination of the set of points. Alternatively, the device 30 can transmit information regarding a currently illuminated point via the first interface 31 to the pair of augmented-reality glasses 1. An analysis unit 33 determines information regarding at least a subset of the illuminated points that have been captured by the camera of the pair of augmented-reality glasses 1. The determined information can, for example, be position information regarding the illuminated points which have been determined through a preliminary processing of the camera images in the pair of augmented-reality glasses 1 and transmitted to the device 30. An evaluation of the camera images can, alternatively, also be performed by an image processing unit 34 of the analysis unit 33. In both cases, a search in the camera image can take place in the surroundings of a position at which an illuminated point was located in the camera image during an initialization. In the case of an unsuccessful search for an illuminated point in the camera image, a search for a subsequent illuminated point is then initiated after a defined period of time. Through a comparison of the subset of the illuminated points with a known geometry of the set of points, a calibration module 5 finally determines a transformation specification for the pair of augmented-reality glasses 1. Information regarding the transformation specification is output to a graphics unit 6 via the interface 31 of the device 30. The graphics unit 6 can then adjust the display of the pair of augmented-reality glasses 1 according to a determined attitude making use of the transformation specification. The display of the pair of augmented-reality glasses 1 is adjusted here in such a way that visible objects are overlaid by displayed objects in an optically correct manner. The graphics unit 6 can be an element of the pair of augmented-reality glasses 1, or can be connected via an interface to the pair of augmented-reality glasses 1.

The control module 32, the analysis unit 33 and the image processing unit 34 can be controlled by a control unit 35. Settings of the control module 32, the analysis unit 33, the image processing unit 34 or the control unit 35 can be changed when relevant via a user interface 38. The data arising in the device 30, if required, can be stored in a memory 36 of the device 30, for example, for a later evaluation or for use by the components of the device 30. The control module 32, the analysis unit 33, the image processing unit 34 and the control unit 35 can be realized as dedicated hardware, for example, as integrated circuits. They can, however, of course also be partially or fully combined, or implemented as software that runs on a suitable processor, for example, on a CPU or a GPU. The interface 31 and the output 37 can be implemented as separate interfaces or as a combined, bidirectional interface.

Figure 5:
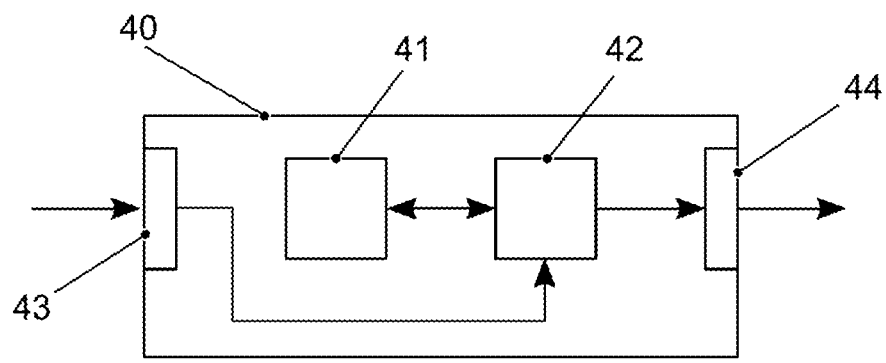
FIG. 5 shows a second embodiment of a device for calibrating a pair of augmented-reality glasses in a transportation vehicle.

FIG. 5 shows a simplified schematic illustration of a second disclosed embodiment of a device 40 for calibrating a pair of augmented-reality glasses in a transportation vehicle. The device 40 comprises a processor 42 and a memory 41. The device 40 is, for example, a computer or a control device. The device 40 has an input 43 for the reception of information, for example, of image data of a camera of the pair of augmented-reality glasses. Instructions, which when executed by the processor 42 cause the device 40 to determine a transformation specification for the pair of augmented-reality glasses, are stored in the memory 41. A comparison of a subset of illuminated points captured by the camera out of a set of sequentially illuminated points with a known geometry of the set of points is carried out for this purpose. The instructions stored in the memory 41 thus embody a program, executable by the processor 42, that realizes the disclosed method. Data generated by the processor 42 are made available via an output 44. They can, in addition, be stored in the memory 41. The input 43 and the output 44 can be combined into a bidirectional interface.

The processor 42 can comprise one or a plurality of processor units, for example, microprocessors, digital signal processors or combinations thereof.

The memories 36, 41 of the disclosed embodiment described can comprise both volatile and non-volatile memory regions and comprise highly varied memory devices and memory media, for example, hard disks, optical storage media or semiconductor memories.

Figure 6:
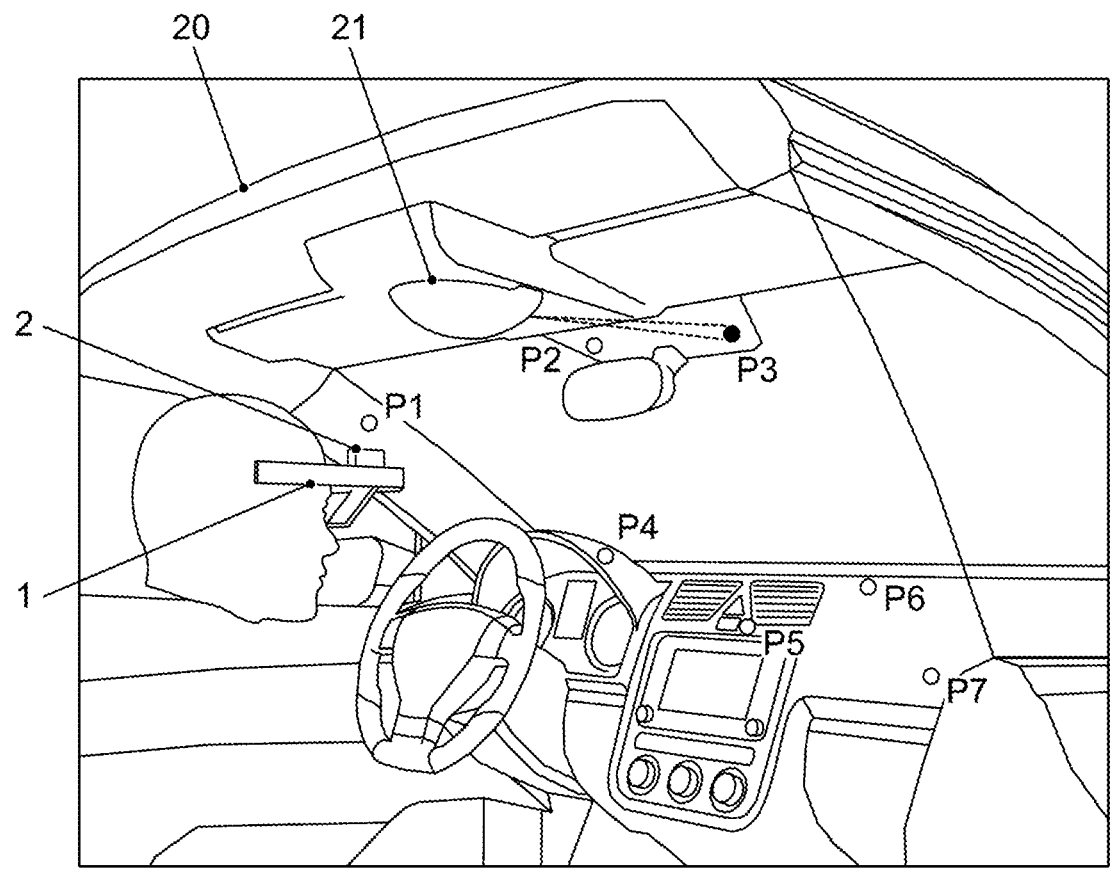
FIG. 6 schematically illustrates an interior of a transportation vehicle in which a disclosed solution is realized by a single light source.

FIG. 6 schematically illustrates an interior of a transportation vehicle 20 in which a disclosed solution is realized by a single light source 21. The transportation vehicle 20 is, again, a transportation vehicle by way of example. A light source 21 is installed at the roof of the transportation vehicle 20. The light source 21 can, of course, also be installed at another position, for example, in the interior mirror or in one of the A-pillars. It is also possible to use a plurality of light sources 21 which transmit targeted light beams. The situation with light sources 21 switched on is shown. The light source 21 may generate light of a wavelength not visible for humans, for example, light in the infrared spectral region. The light source 21 is designed in such a way that the light generated by it impinges on the specified coordinates in a punctiform manner. In the example, the third point P3 of a set of points P1-P7 is illuminated by the light-source, which is shown both by a suggested light beam emerging from the light source 21 as well as by the filled circle at the point P3. The unfilled circles at the other points P1-P2, P4-P7 illustrate that these are not currently illuminated. For the sequential illumination of the points P1-P7, the light source 21 is controlled in such a way that the light beam generated by the light source 21 impinges on the individual points P1-P7 one after another. It is only for an initialization of the calibration phase that all the points P1-P7 might be illuminated simultaneously. The currently illuminated point P1-P7 appears in each case in the camera image of a camera 2 of a pair of augmented-reality glasses 1 worn by the user as a bright spot, so that it can be detected easily.

Figure 7:
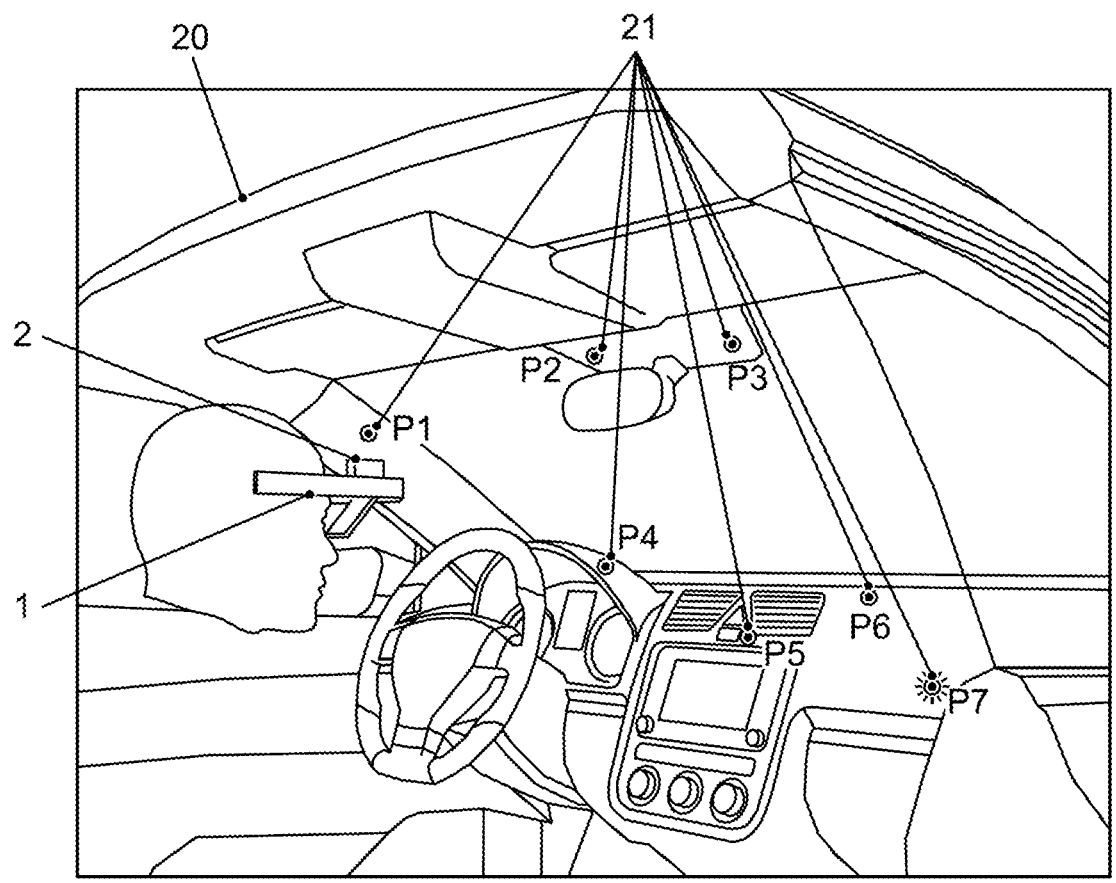
FIG. 7 schematically illustrates an interior of a transportation vehicle in which a disclosed solution is realized by a plurality of light sources.

FIG. 7 schematically illustrates an interior of a transportation vehicle 20 in which a disclosed solution is realized by a plurality of light sources 21. A light source 21, an infrared light-emitting diode, for example, is installed at each of the positions of the desired points P1-P7. For the sequential illumination of the points P1-P7, the light sources 21 are controlled in such a way that they are illuminated briefly one after another. In the example shown, the light source 21 at the position of point P7 is active, which is shown by the suggested light beams emerging from the light source 21. It is only for an initialization of the calibration phase that all of the light sources 21 might be active simultaneously. The currently active light source 21 appears in each case in the camera image of a camera 2 of a pair of augmented-reality glasses 1 worn by the user as a bright spot.

LIST OF REFERENCE SIGNS

1 Augmented-reality glasses
2 Camera
3 Interface
4 Attitude-determination device
5 Calibration module
6 Graphics unit
7 Projection unit
10 Sequential illumination of a set of points
11 Capture of a subset of the illuminated points
12 Determination of a transformation specification
20 Transportation vehicle
21 Light source 22 Navigation system
23 Data transmission unit
24 Assistance system
25 Memory
26 Network
30 Device
31 Interface
32 Control module
33 Analysis unit
34 Image processing unit
35 Control unit
36 Memory
37 Output
38 User interface
40 Device
41 Memory
42 Processor
43 Input
44 Output
P1-P7 Illuminated point

The invention claimed is:

1. A non-transitory computer-readable storage medium with instructions which cause the computer to execute a method for calibrating a pair of augmented-reality glasses in a transportation vehicle when the instructions are executed by a computer, the method comprising:
sequentially illuminating a set of points at predefined locations in an interior of the transportation vehicle;
capturing at least a subset of the illuminated points by a camera arranged in the pair of augmented-reality glasses; and
determining a transformation specification for the pair of augmented reality glasses by comparing the subset of the illuminated points that have been captured by the camera with a known geometry of the set of points,
wherein an initialization signal of a calibration phase is performed by a single or repeated simultaneous illumination of the set of points followed by the sequential illumination, and
wherein, in response to the initialization signal, the augmented-reality glasses can determine that illumination of one of the set of points is the first point in the sequence.

2. A device for calibrating a pair of augmented-reality glasses in a transportation vehicle, the device comprising:
a control module for controlling at least one light source arranged in the transportation vehicle for the sequential illumination of a set of points at predefined locations in an interior of the transportation vehicle;
an analysis unit for determining information regarding at least a subset of the illuminated points captured by a camera of the pair of augmented-reality glasses; and
a calibration module for determining a transformation specification for the pair of augmented-reality glasses by comparing the subset of the illuminated points with a known geometry of the set of points,
wherein an initialization signal of a calibration phase is performed by a single or repeated simultaneous illumination of the set of points followed by the sequential illumination, and
wherein, in response to the initialization signal, the augmented-reality glasses can determine that illumination of one of the set of points is the first point in the sequence.

3. A system for calibrating a pair of augmented-reality glasses in a transportation vehicle, the system comprising:
at least one light source arranged in the transportation vehicle for the sequential illumination of a set of points at predefined locations in an interior of the transportation vehicle;
a camera arranged in the pair of augmented-reality glasses for the capture of at least a subset of the illuminated points; and
a calibration module for determining a transformation specification for the pair of augmented-reality glasses by comparing the subset of the illuminated points captured by the camera with a known geometry of the set of points,
wherein an initialization signal of a calibration phase is performed by a single or repeated simultaneous illumination of the set of points followed by the sequential illumination, and
wherein, in response to the initialization signal, the augmented-reality glasses can determine that illumination of one of the set of points is the first point in the sequence.

4. A transportation vehicle comprising:
at least one light source arranged in an interior, wherein the at least one light source sequentially illuminates a set of points at predefined locations in an interior of the transportation vehicle for calibrating a pair of augmented-reality glasses,
wherein an initialization signal of a calibration phase is performed by a single or repeated simultaneous illumination of the set of points followed by the sequential illumination, and
wherein, in response to the initialization signal, the augmented-reality glasses can determine that illumination of one of the set of points is the first point in the sequence.

5. The transportation vehicle of claim 4, further comprising a calibration module for determining a transformation specification for the pair of augmented-reality glasses through a comparison of a subset of the illuminated points captured by a camera of the pair of augmented-reality glasses with a known geometry of the set of points.

6. Augmented-reality glasses comprising:
a camera mounted to the glasses for capturing the surroundings of the pair of augmented-reality glasses; and
a calibration module mounted to the glasses for determining a transformation specification for the pair of augmented-reality glasses,
wherein the calibration module determines the transformation specification by comparing a subset of illuminated points captured by the camera out of a set of sequentially illuminated points with a known geometry of the set of points,
wherein an initialization signal of a calibration phase is performed by a single or repeated simultaneous illumination of the set of points followed by the sequential illumination, and
wherein, in response to the initialization signal, the augmented-reality glasses can determine that illumination of one of the set of points is the first point in the sequence.

7. A method for calibrating a pair of augmented-reality glasses in a transportation vehicle; the method comprising:
sequentially illuminating a set of points at predefined locations in an interior of the transportation vehicle;
capturing at least a subset of the illuminated points by a camera arranged in the pair of augmented-reality glasses; and determining a transformation specification for the pair of augmented-reality glasses by comparing the subset of the illuminated points that have been captured by the camera with a known geometry of the set of points, wherein an initialization signal of the calibration phase is performed by a single or repeated simultaneous illumination of the set of points, and wherein, in response to the initialization signal, the augmented-reality glasses can determine that illumination of one of the set of points is the first point in the sequence.

8. The method of claim 7, wherein the individual points are illuminated in a specified sequence during the sequential illumination of the set of points in the interior of the transportation vehicle.

9. The method of claim 7, wherein the capture of an illuminated point by the camera involves a search in the camera image in the surroundings of a position at which an illuminated point was located in the camera image during the initialization.

10. The method of claim 9, wherein a search for a subsequent illuminated point is initiated after a defined period of time in response to an unsuccessful search for an illuminated point.

11. The method of claim 7, wherein information regarding a currently illuminated point is transmitted by the transportation vehicle to the pair of augmented-reality glasses.

12. The method of claim 7, wherein a point is irradiated by a light source or a light source located at the position of a point is activated for illumination of the point.

13. The method of claim 7, wherein a request is made to a wearer of the pair of augmented-reality glasses to make a head movement.

* * * * *